(12) United States Patent
Guillory et al.

(10) Patent No.: US 8,607,251 B1
(45) Date of Patent: Dec. 10, 2013

(54) DYNAMIC ACCESSIBILITY BEHAVIOR

(75) Inventors: Christopher Todd Guillory, Santa Monica, CA (US); Dominic Michael Mazzoni, Fremont, CA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/239,319

(22) Filed: Sep. 21, 2011

(51) Int. Cl.
 *G06F 3/00* (2006.01)
(52) U.S. Cl.
 USPC .......................................................... 719/318
(58) Field of Classification Search
 USPC .......................................................... 719/318
 See application file for complete search history.

(56) References Cited

U.S. PATENT DOCUMENTS

| | | | | |
|---|---|---|---|---|
| 5,946,697 | A * | 8/1999 | Shen | 715/205 |
| 6,549,221 | B1 * | 4/2003 | Brown et al. | 715/854 |
| 6,738,951 | B1 * | 5/2004 | Weiss et al. | 715/239 |
| 7,434,167 | B2 * | 10/2008 | Sinclair et al. | 715/744 |
| 7,620,890 | B2 * | 11/2009 | Dietl et al. | 715/234 |
| 7,712,025 | B2 * | 5/2010 | Roessler | 715/234 |
| 8,103,956 | B2 * | 1/2012 | Trujillo | 715/700 |
| 8,234,593 | B2 * | 7/2012 | Gordon et al. | 715/865 |
| 2003/0004994 | A1 * | 1/2003 | Kamrowski et al. | 707/513 |
| 2006/0063138 | A1 * | 3/2006 | Loff et al. | 434/112 |
| 2006/0288283 | A1 * | 12/2006 | Schrepp et al. | 715/700 |
| 2007/0233820 | A1 * | 10/2007 | Schneider | 709/220 |
| 2011/0258532 | A1 * | 10/2011 | Ceze et al. | 715/234 |

OTHER PUBLICATIONS

Kathrin Bottger, Towards Reconcilin Use Cases via Controlled Language and Graphical Models , 2003.*
"Accessibility", The Chromium Projects, retrieved from <https://sites.google.com/a/chromium.org/dev/developers/design-documents/accessibility>, Jul. 31, 2011.

* cited by examiner

*Primary Examiner* — Lechi Truong
(74) *Attorney, Agent, or Firm* — McDermott Will & Emery LLP

(57) ABSTRACT

Configurations for dynamically detecting accessibility behavior in web client are disclosed. The subject technology initially determines whether an accessibility application (e.g., a screen reader) is executing. In one example, an event identifier is transmitted to simulate an accessibility event. The subject technology then determines whether a separate process from the web client queries for the transmitted event identifier. A global parameter is then set in the web client to enable an accessibility feature(s) of the web client if the accessibility application is executing. The subject technology then enables the web client for an accessibility mode.

22 Claims, 5 Drawing Sheets

DYNAMIC ACCESSIBILITY BEHAVIOR

BACKGROUND

Web accessibility refers to the practice of making websites usable by people of all abilities and disabilities. When a web site is designed to achieve web accessibility, all users can have equal access to information and functionality. By way of example, when text and images are large or enlargeable, it is easier for users with poor sight to read and understand the content. Some disabled users can further utilize assistive technology to provide more accessibility to web content. For example, a screen reader is an application that attempts to identify and interpret what is being displayed on the screen for presentation to a user in a more accessible form according to the user's needs (e.g., text-to-speech, sound icons, or as Braille).

SUMMARY

The subject technology provides for dynamically detecting accessibility behavior in a web client. The subject technology determines whether an accessibility application is executing. The subject technology sets a global parameter in the web client to enable accessibility features if the accessibility application is executing. Further, the subject technology enables the web client for an accessibility mode.

The subject technology also provides a system for dynamically detecting accessibility behavior in a web client. The system includes memory and one or more processors. The system further includes one or more modules stored in memory and configured for execution by the one or more processors. The system includes include an accessibility module configured to determine whether an accessibility application is executing. The system includes a rendering module configured to provide an accessibility tree in response to detecting that the accessibility application is executing by the accessibility module. The system includes a browsing module configured to render content included on a web page based on the accessibility tree from the rendering module.

The subject technology further provides for transmitting an event identifier to simulate an accessibility event. The subject technology determines whether a separate process from a web client queries for the transmitted event identifier. The subject technology then sets a global parameter in the web client to enable accessibility features if the separate process queries for the transmitted event identifier. Additionally, the subject technology enables the web client for an accessibility mode if the global parameter is set.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
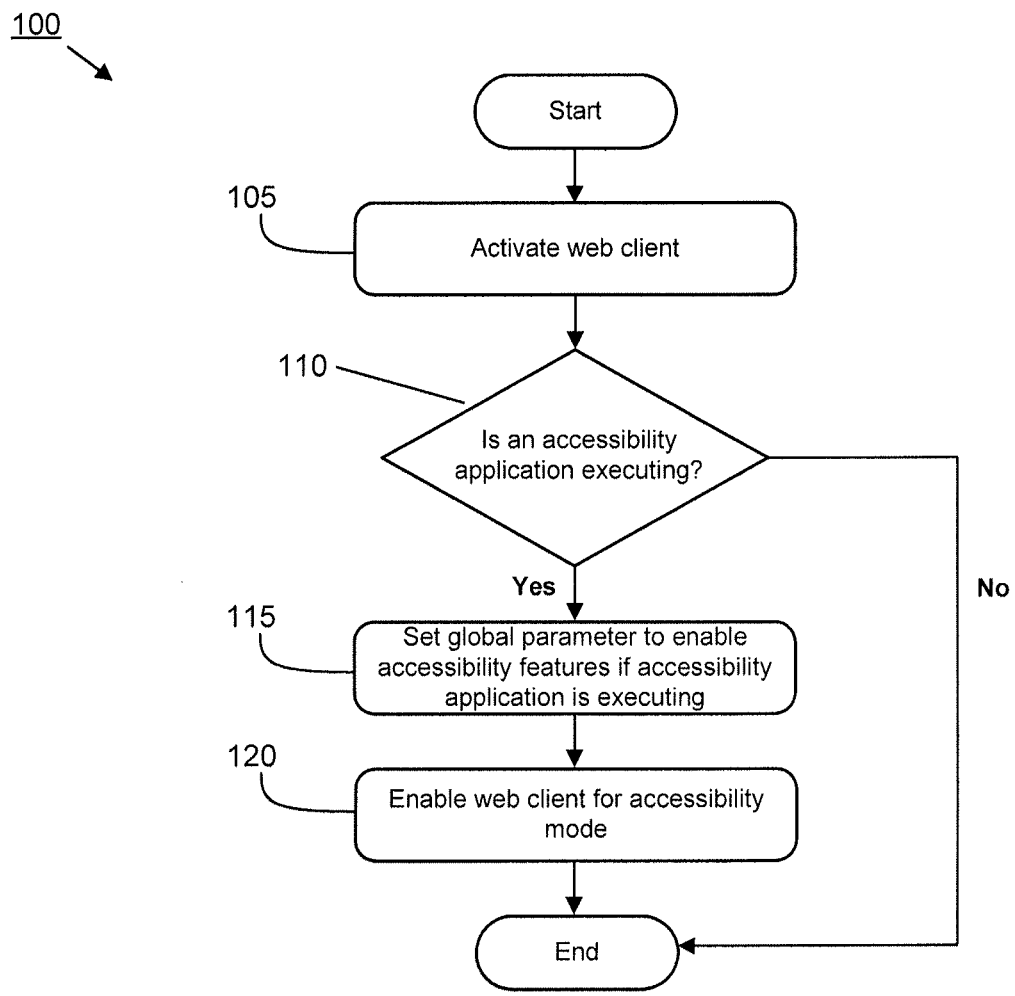
FIG. 1 conceptually illustrates an example process for dynamically detecting accessibility behavior in a web client.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Assistive technology can be provided for disabled users in order to access web content (e.g., a web page) via a web client (e.g., a browser). For example, a vision-impaired user can utilize a screen reader for providing information from the web content in an auditory format (e.g., voice) or by presenting the web content in Braille characters for the visually impaired. Accessibility protocols exist for assistive technology (an "accessibility application" as used herein) to communicate with accessible software programs, such as an accessible web client. The accessibility protocols can include communication in two different directions: 1) assistive technology sends messages to the web client, and 2) the web client sends messages to the assistive technology.

These accessibility protocols can be used by other applications for other purposes, including, but not limited, to automation. For example, tablet PCs may use accessibility protocols to query an application to determine the object under the cursor position, or macro recorder applications may use accessibility protocols to automate the control of an application. Assistive technology can utilize such accessibility protocols, resulting in thousands of messages that are generated per second or more. Thus, assistive technology should process these messages quickly and efficiently or the user experience will be degraded. In contrast, another application (e.g., a web client) that uses an accessibility protocol(s) may not process these messages related to an accessibility protocol(s) quickly or efficiently.

Optimizing the behavior of the web client for fast and efficient interaction with assistive technology can require putting the web client into a special state. Putting the web client in this state makes it more optimal for communicating with assistive technology, but at the cost of increased memory usage and CPU usage. This state is undesirable when interaction with assistive technology is not actively communicating with the web client.

One possible solution would be to put the web client into the accessibility-optimized mode if and when any communication using an accessibility protocol is first received. This can be undesirable because applications other than assistive technology may use accessibility protocols as well. As a result, the web client would unnecessarily incur the cost of optimizing the web client for communication with assistive technology.

To address the aforementioned issues, the subject technology can send an accessibility communication from the web client to any other application(s) that listens for such accessibility communication (e.g., messages). In particular, the subject technology provides accessibility communication that is designed to indicate the presence of information that would be very interesting to assistive technology, but would not be interesting to other applications that use an accessibility protocol. For example, in one example operating system, an "EVENT_OBJECT_ALERT" notification was found to be interesting to different screen reader applications but not interesting to other applications that use an accessibility protocol.

The subject technology can listen for a response to the communication sent from the web client. If a query for more information about the communication is received, the web client assumes that assistive technology is present and then enters the optimized accessibility mode. However, if a query is not ever received, then the web client assumes that any accessibility communication is coming from applications other than assistive technology. Thus, the web client does not enter the optimized accessibility mode and avoids incurring the cost of entering the optimized accessibility mode.

In some configurations, web content can be represented based on a document object model (DOM) that represents each element (e.g., forms, buttons, textual content, etc.) from the web content. The DOM in some configurations is configured as a tree structure including discrete elements as nodes within branches of the DOM tree. A node in the DOM tree can represent an object that corresponds with an element from the web content. Additionally, a render tree can be provided based on one or more nodes of the DOM tree (e.g., for elements from the web content) that will be rendered to a display or screen by the web client. In one example, the render tree includes a subset of the nodes in the DOM tree.

In some configurations, upon detection of an accessibility application (e.g., a screen reader), the web client can provide an accessibility tree for rendering the web content in an optimized accessibility mode of the web client. In one example, the accessibility tree is based one or more nodes of the aforementioned render tree. The accessibility tree can include document specific elements that provide additional or different elements in the web content for disabled users. In some instances, detection of an accessibility application can be unreliable and generate a false-positive (i.e., detecting an accessibility application when no such application is executing) that can cause the web client to incorrectly render the web content based on the inclusion of the accessibility tree. Additionally, rendering times for the web content can increase by unnecessarily processing the accessibility tree. Thus, the user experience in the web client is degraded.

Some configurations of the subject technology therefore provide for accurately detecting an accessibility program before web content is rendered by the web client. In one aspect, some implementations determine whether an accessibility application is executing. The web client can include multiple processes (e.g., a browser process and a renderer process) in which a browser process is responsible for operations for controls and user interface for the web client, and a renderer process is responsible for operations for rendering the web content for display. Some implementations can determine whether the accessibility application is executing by 1) transmitting an event identifier to simulate an accessibility event, and 2) determining whether a separate process from the web client queries for the transmitted event identifier. In the event that the separate process queries for the transmitted event identifier, the implementation detects that the accessibility application is executing. The implementation then sets a global parameter to enable accessibility features. In some configurations, the global parameter is set within the web client so that another process in the web client can read/access the global parameter. After the global parameter is set, some implementations transmit an accessibility tree to a browser process of the web client.

FIG. 1 conceptually illustrates an example process 100 for dynamically detecting accessibility behavior in a web client. In particular, the process 100 can enable accessibility features in the web client if compatible assistive technology is attempting to interact with the web client.

The process 100 starts at 105 when the web client is activated (e.g., by launching or running the web client). In one example, the web client implements a multi-process architecture which includes different processes for rendering and browsing. More specifically, the web client can include 1) a rendering process for rendering content (e.g., for a site that a user visits), and 2) a browser process for providing the web client's user interface. The web client can further provide a channel for inter-process communication between the rendering and browser processes.

After activating the web client, the process 100 at 110 determines whether an accessibility application is executing. In some configurations, the determination at 110 occurs before rendering web content. One example of determining whether the accessibility application is executing is discussed in more detail with respect to FIG. 2 below. The accessibility application can be a screen reader that converts content (e.g., text) in the web client to speech (or another similar auditory form) or to one or more Braille characters.

Although FIG. 1 illustrates that the process 100 at 110 determines whether the accessibility application is executing after the web client is activated, in some configurations, the determination at 110 can be performed after a user opens web content or navigates to a web page. In this manner, the process 100 can dynamically detect whether the accessibility application is executing. Irrespective of when the process 100 performs this operation, the process 100 ends if the process 100 does not determine at 110 that an accessibility application is executing.

Alternatively, if the process 100 determines that the accessibility application is executing at 110, the process 100 then at 115 sets a global parameter to enable accessibility features if the accessibility application is executing. In one example, the global parameter is a flag indicating that an accessibility feature(s) is enabled for the web client (e.g., due to the detection of the accessibility application). The process 100 can set global parameter in the web client to enable another process (e.g., a browser process) to access the global parameter.

The process 100 continues to 120 to enable the web client for an accessibility mode. More specifically, the process 100 at 120 prepares the web client's internal state for accessibility. In one example, the process 100 at 120 can transmit an accessibility tree to a browser process of the web client if the global parameter is set. In some configurations, the accessibility tree is based on a render tree. As described above, the render tree can include one or more objects based a document object model (DOM) for representing elements of an HTML document in object form. The browser process can then receive the accessibility tree in order to present one or more different UI elements in the web client UI according to the accessibility tree. By way of example, the browser process in some configurations can enlarge a UI element (e.g., an URL address bar, menu item, icon, dialog box, etc.) in order to assist a vision-impaired user. Moreover, the browser process can cache the accessibility tree in order to minimize the interprocess communication overhead between the browser and rendering processes of the web client. The process 100 then ends.

Although the example described above in FIG. 1 relates to a discussion for a multi-process web browser, some configurations of the subject technology can utilize a single-process web browser and still be within the scope of the subject technology.

As described above, the process 100 of FIG. 1 can determine whether an accessibility application is executing at 110. The following disclosure describes an example process for determining whether an accessibility application is currently executing in a system in more detail. In a system in which the web client and the accessibility are concurrently executing (e.g., both running on an operating system), the example process described below can perform operations to determine a runtime presence of the accessibility application in the system. In one example, the accessibility application can be a separate process in the system from the web client. The below discussion in connection with FIG. 2 can be implemented by a single process web client or a multi-process web client and still be within the scope of the subject technology.

Figure 2:
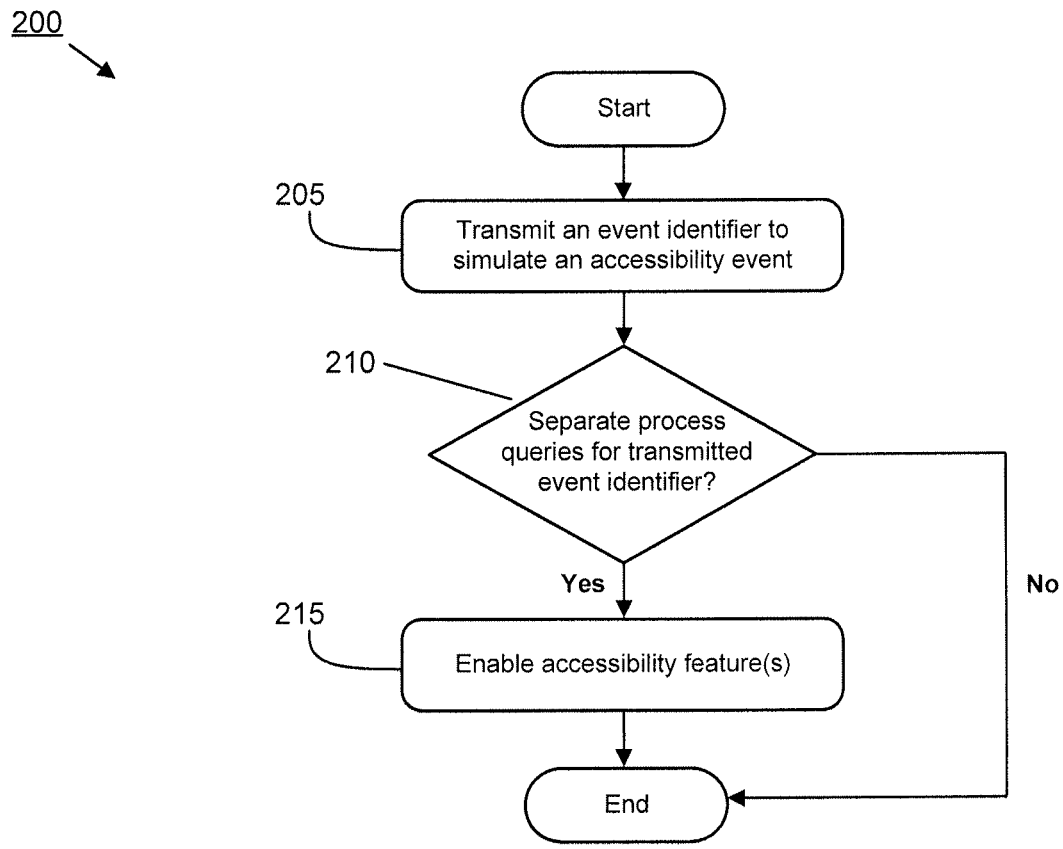
FIG. 2 conceptually illustrates an example process for detecting whether an accessibility application is executing in a system.

FIG. 2 conceptually illustrates an example process 200 for detecting whether an accessibility application is executing in a system. In particular, the process 200 simulates an accessibility event for determining whether an accessibility application (e.g., a screen reader) is executing. The accessibility application can execute as a separate process in the system (e.g., a separate process from the web client). In some configurations, the accessibility application can listen for a system event corresponding to accessibility functionality within the system. For instance, the separate process corresponding to the accessibility application is registered to receive one or more notifications corresponding to the accessibility event.

The process 200 starts at 205 by transmitting an event identifier to simulate an accessibility event. The event identifier can correspond with a system alert associated with an accessibility feature or function in one example. In some configurations, the system can provide a Component Object Model interface (or any other software component communication model) to enable software components to communicate with each other. The process 200 can transmit the event identifier utilizing the Component Object Model interface. For instance, the Component Object Model enables interprocess communication between the web client and the separate process in the system.

The process 200 at 210 then determines whether a separate process from the web client queries for the transmitted event identifier. In one example, the process 200 can determine whether the separate process queries for the transmitted event identifier by receiving a request to obtain information about an accessibility object based on the event identifier. The accessibility object in some configurations can include information pertaining to one or more accessibility features or functions of the web client. The process 200 can determine that the accessibility application is executing because only an accessibility application (such as a screen reader) would query for information based the event identifier (e.g., for an accessibility object based on the event identifier).

Alternatively or conjunctively, the process 200 can determine whether the accessibility application is executing by checking a flag indicating that the accessibility application is activated. For instance, the flag can be a system property that the process 200 can check through a corresponding system or procedure call.

If the process 200 determines that the accessibility application is not executing at 210, the process 200 then ends. Alternatively, if the process 200 determines that the accessibility application is executing at 210, the process 200 continues to 215 to enable an accessibility feature(s) for the web client. In one example, the process 200 can set a flag to indicate that the accessibility feature(s) are activated for the web client because the accessibility application was detected based on the determination at 210. The process 200 then ends.

In some configurations, the event identifier can be received by a background process (e.g., a service, daemon, etc.) that facilitates communication between the web client and the separate process. The background process can then notify the separate process of the event identifier. In an instance that the separate process is an accessibility application, the separate process can then respond to the event identifier by submitting a query to the background process. The background process can then transmit the query to the web client. Upon receiving the query based on the event identifier, the web client then determines that the accessibility application is currently executing in the system. The web client can determine that the accessibility application is executing because only an accessibility application (such as a screen reader) would query for information based the event identifier (e.g., for an accessibility object based on the event identifier).

The following section describes an example computing environment including a system that can implement the above described processes as a computer program running on a particular machine, such as a computer or mobile device, or stored as instructions in a computer readable medium.

Figure 3:
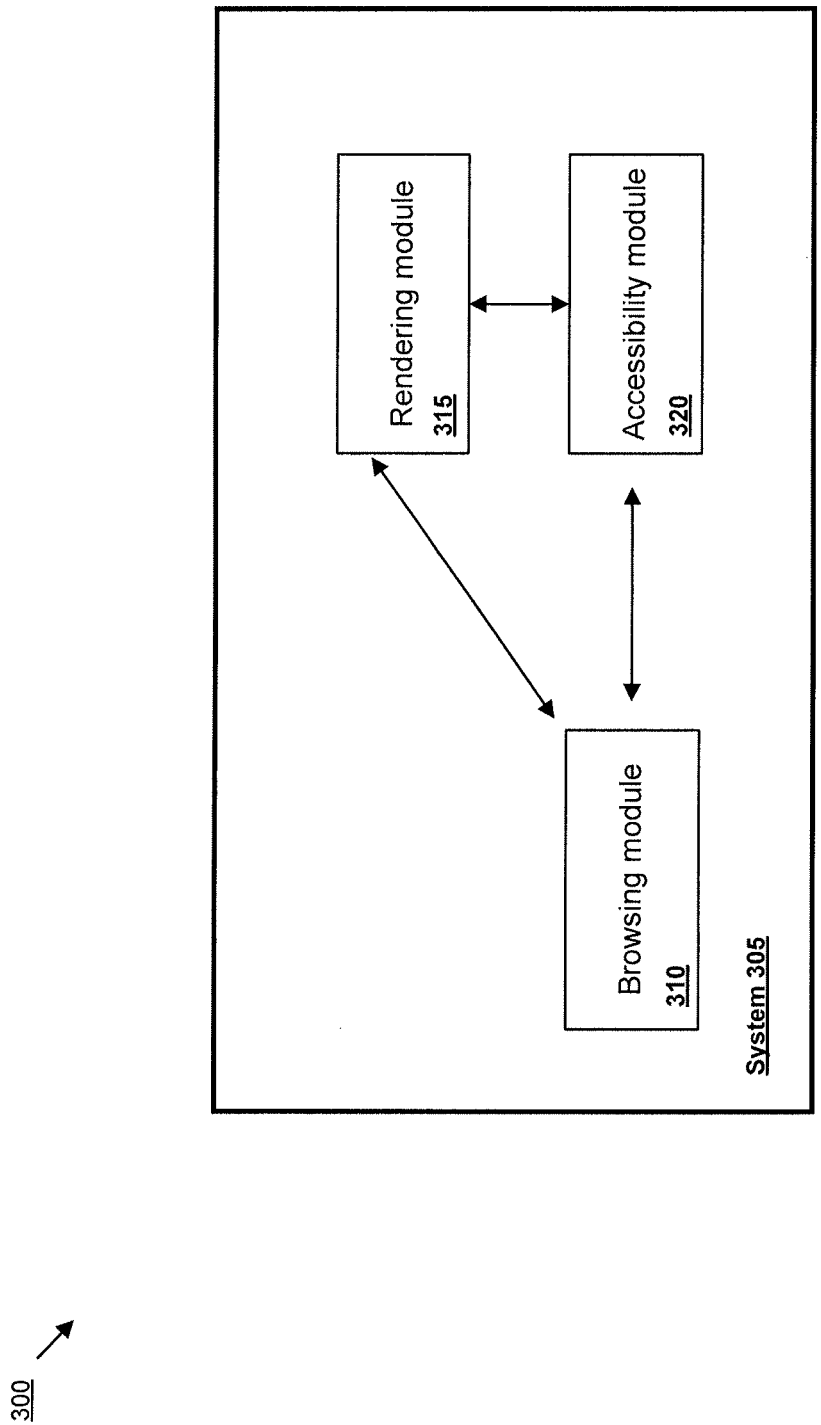
FIG. 3 conceptually illustrates an example computing environment including a system for dynamically detecting accessibility behavior in a web client.

FIG. 3 conceptually illustrates an example computing environment including a system for. In particular, FIG. 3 shows a system 305 for implementing the above described processes FIGS. 1 and 2. The system 305 can be configured for dynamically detecting whether compatible assistive technology is attempting to interactive with a web client. The system 305 can include the below described modules in a web client. The web client can include a web browser or another application capable of loading different web pages and rendering web content.

As shown in FIG. 3, the system 305 includes several modules for providing different functionality. The system 305 is configured to include a browsing module 310, a rendering module 315, and an accessibility module 320. The accessibility module 320 is configured to determine whether an accessibility application is executing. In particular, the accessibility module can implement the processes described above in FIGS. 1 and 2. The accessibility application, moreover, can be a screen reader in one example. The rendering module 315 can be configured to provide an accessibility tree in response to detecting that the accessibility application is executing by the accessibility module 320. The accessibility tree is based on a render tree in one example. For instance, the render tree can include one or more nodes and each node corresponds with a user interface element in the web client. The browsing module 310 is configured to render content included on a web page based on the accessibility tree from the rendering module 315. The browsing module 310 can cache the accessibility tree received from the rendering module 315 in some configurations.

As shown in FIG. 3, each of the aforementioned modules can be configured to communicate between each other. For instance, different data, messages, API calls and returns can be passed between the different modules in the system 305.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software components can also be implemented as separate programs. Finally, any combination of separate programs that together implement a software component described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which the processes described above in FIGS. 1 and 2 can be implemented.

Figure 4:
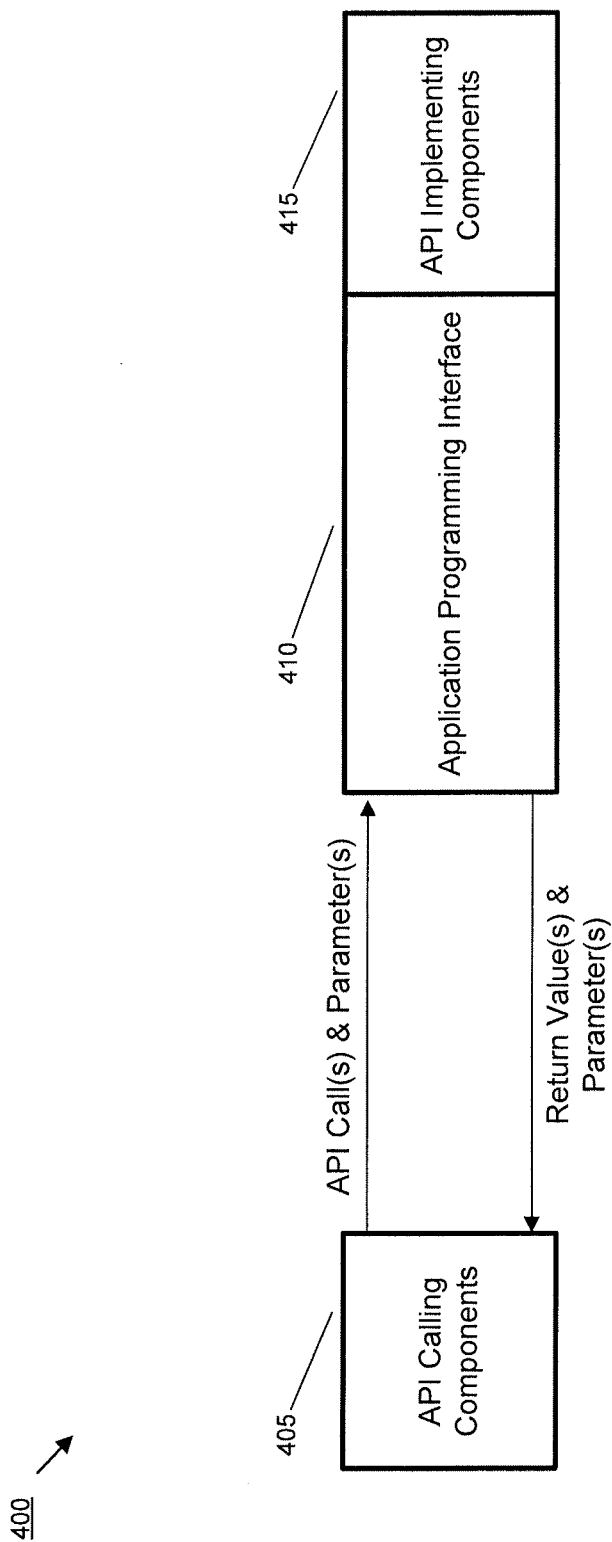
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 415 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 405. The API 410 can specify at least one calling convention that specifies how a function in the API implementing component receives parameters from the API calling component and how the function returns a result to the API calling component. The API calling component 405 (e.g., an operating system, a library, a device driver, an API, an application program, software or other module), makes API calls through the API 410 to access and use the features of the API implementing component 415 that are specified by the API 410. The API implementing component 415 can return a value through the API 410 to the API calling component 405 in response to an API call.

It will be appreciated that the API implementing component 415 can include additional functions, methods, classes, data structures, and/or other features that are not specified through the API 410 and are not available to the API calling component 405. It should be understood that the API calling component 405 can be on the same system as the API implementing component 415 or can be located remotely and accesses the API implementing component 415 using the API 410 over a network. While FIG. 4 illustrates a single API calling component 405 interacting with the API 410, it should be understood that other API calling components, which can be written in different languages (or the same language) than the API calling component 405, can use the API 410.

The API implementing component 415, the API 410, and the API calling component 405 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
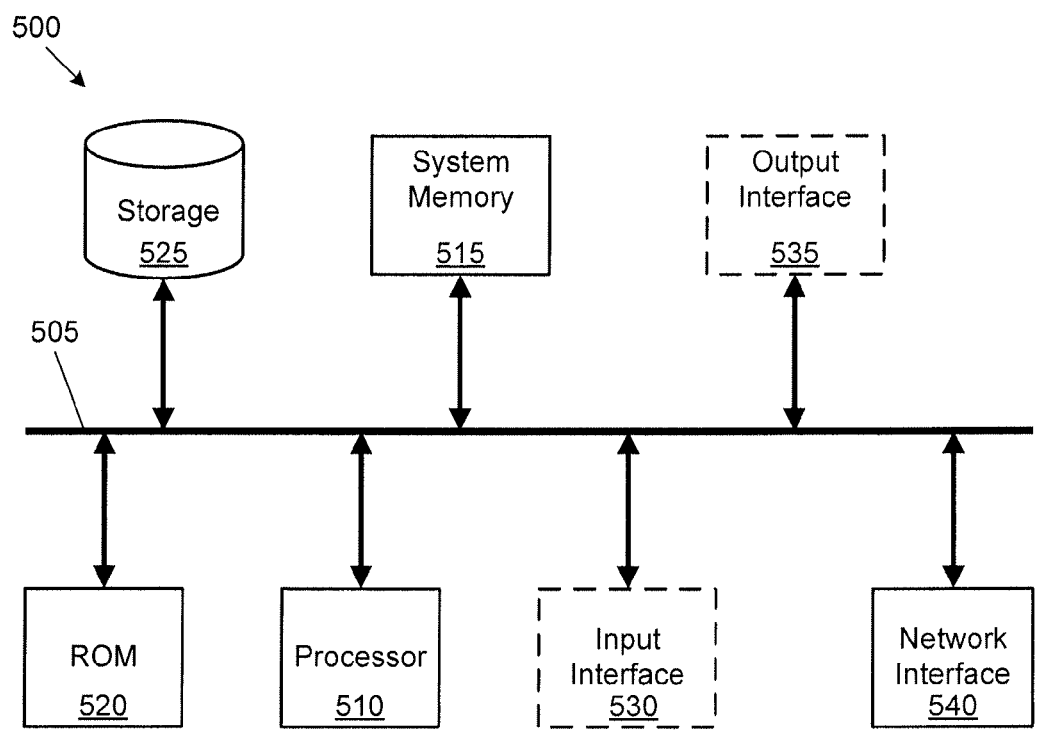
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for dynamically detecting accessibility behavior in an application, the method comprising:
    determining whether an accessibility application is executing, wherein determining whether the accessibility application is executing comprises:
        checking a flag indicating that the accessibility application is activated;
        transmitting, by the application, an event identifier to simulate an accessibility event; and
        determining, before rendering any content in the application, whether a separate process from the application queries for the transmitted event identifier;
    setting a global parameter in the application to enable accessibility features if the accessibility application is executing; and
    enabling the application for an accessibility mode, wherein enabling the application for the accessibility mode comprises transmitting an accessibility tree if the global parameter is set.

2. The method of claim 1, wherein the application comprises a web client that includes multiple processes.

3. The method of claim 1, wherein the accessibility tree is transmitted to a browser process of the application.

4. The method of claim 1, wherein the accessibility application is a screen reader.

5. The method of claim 4, wherein the screen reader converts content in the application to speech.

6. The method of claim 4, wherein the screen reader presents content in the application as one or more Braille characters.

7. The method of claim 1, wherein the event identifier corresponds with a system alert.

8. The method of claim 1, wherein the separate process comprises a screen reader.

9. The method of claim 1, wherein the separate process is registered to receive one or more notifications corresponding to the accessibility event.

10. The method of claim 1, wherein determining whether the separate process queries for the transmitted event identifier comprises receiving a request to obtain information about an accessibility object based on the event identifier.

11. The method of claim 1, wherein transmitting the event identifier is based on a Component Object Model.

12. The method of claim 11, wherein the Component Object Model enables interprocess communication between the application and the separate process.

13. The method of claim 1, wherein the event identifier is received by a background process that provides a communication interface between the application and the separate process.

14. The method of claim 1, wherein the accessibility tree is based on a render tree.

15. The method of claim 14, wherein determining whether the accessibility application is executing occurs before rendering web content based on the render tree.

16. A system for dynamically detecting accessibility behavior in an application, the system comprising:
    memory;
    one or more processors;
    one or more modules stored in memory and configured for execution by the one or more processors, the modules comprising:
    an accessibility module configured to determine whether an accessibility application is executing, wherein the accessibility module determines whether the accessibility application is executing by:
        checking a flag indicating that the accessibility application is activated,
        transmitting, by the application, an event identifier to simulate an accessibility event, and
        determining, before rendering any content in the application, whether a separate process from the application queries for the transmitted event identifier, and
    the accessibility module is further configured to set a global parameter in the application to enable accessibility features if the accessibility application is executing, and enable the application for an accessibility mode, wherein the accessibility module enables the application for the accessibility mode by transmitting an accessibility tree if the global parameter is set;
    a rendering module configured to provide an accessibility tree in response to detecting that the accessibility application is executing by the accessibility module; and
    a browsing module configured to render content included on a web page based on the accessibility tree from the rendering module.

17. The system of claim 16, wherein the accessibility application is a screen reader.

18. The system of claim 16, wherein the accessibility tree is based on a render tree.

19. The system of claim 18, wherein the render tree includes one or more nodes and each node corresponds with a user interface element in the application.

20. The system of claim 19, wherein the browsing module caches the accessibility tree received from the rendering module.

21. A machine-readable medium comprising instructions stored therein, which when executed by a machine, cause the machine to perform operations comprising:
  determining whether an accessibility application is executing, wherein determining whether the accessibility application is executing comprises:
    checking a flag indicating that the accessibility application is activated;
    transmitting, by an application, an event identifier to simulate an accessibility event; and
    determining, before rendering any content in the application, whether a separate process from the application queries for the transmitted event identifier;
  setting a global parameter in the application to enable accessibility features if the separate process queries for the transmitted event identifier; and
  enabling the application for an accessibility mode if the global parameter is set, wherein enabling the application for the accessibility mode comprises transmitting an accessibility tree if the global parameter is set.

22. The machine-readable medium of claim 21, wherein the event identifier indicates a system event associated with an accessibility feature.

* * * * *